Figure 1:
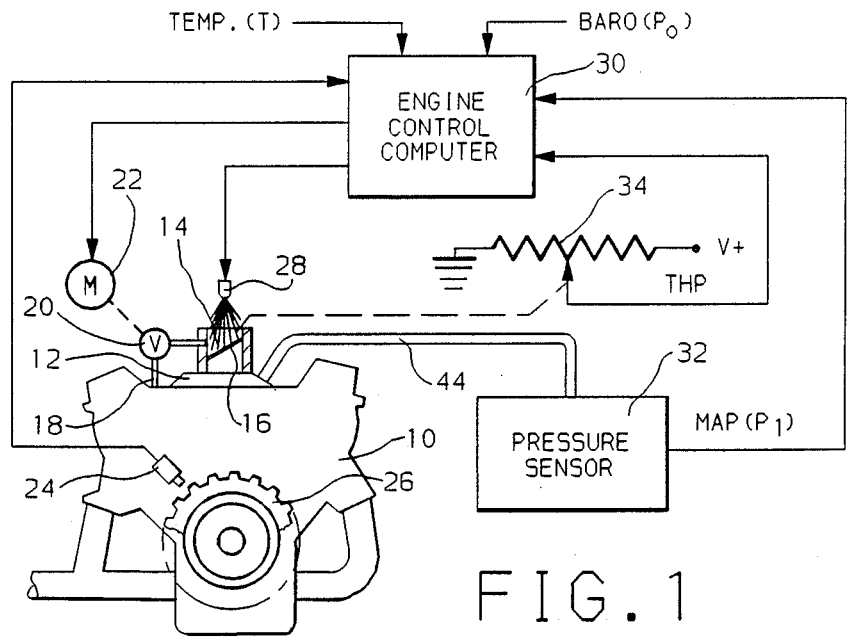

United States Patent [19]

Kolhoff

[11] Patent Number: 4,750,352
[45] Date of Patent: Jun. 14, 1988

[54] MASS AIR FLOW METER

[75] Inventor: James B. Kolhoff, Wixom, Mich.

[73] Assignee: General Motors Corporation, Detroit, Mich.

[21] Appl. No.: 84,573

[22] Filed: Aug. 12, 1987

[51] Int. Cl.$^4$ .................... G01M 15/00; F02D 41/18
[52] U.S. Cl. .................... 73/117.3; 73/118.2; 123/480; 123/494; 364/431.04
[58] Field of Search .............. 123/480, 486, 494; 73/117.3, 118.2; 364/431.04, 431.05

[56] References Cited

U.S. PATENT DOCUMENTS

| 3,871,214 | 3/1975 | Masaki et al. | 73/116 |
| 4,332,226 | 6/1982 | Nomura et al. | 123/494 |
| 4,446,523 | 5/1984 | Reinke | 364/431.05 |
| 4,644,474 | 2/1987 | Aposchanski et al. | 123/494 |
| 4,664,090 | 5/1987 | Kabasin | 123/494 |

Primary Examiner—Andrew M. Dolinar
Attorney, Agent, or Firm—Howard N. Conkey

[57] ABSTRACT

A system and method for measuring the air flow into an engine including a throttle bore and a throttle for varying the effective area of the throttle bore and a throttle bypass passage including a bypass valve for varying the effective area of the bypass passage. The air meter determines the air flow into the engine based upon the effective area established by the throttle and the bypass valve and where at closed throttle position the effective area of the throttle at closed position is determined based upon the air flow into the engine through the bypass passage when the engine idle speed is controlled to a predetermined idle speed.

1 Claim, 1 Drawing Sheet

MASS AIR FLOW METER

This invention relates to a mass air flow meter and specifically relates to such a meter for an internal combustion engine having an intake manifold, an induction passage opening from an air inlet to the intake manifold and including a throttle bore, a variable position throttle in the throttle bore for varying the effective area of the induction passage to regulate the air flow into the intake manifold and an idle air bypass passage bypassing the throttle in the throttle bore and including a bypass valve variably positioned to regulate the idle air flow into the engine for idle speed control.

Numerous systems have been proposed for measuring the mass rate of air flow into an internal combustion engine. Generally these systems require an air flow sensing element positioned in the air stream to sense air flow. For example, some systems may employ a constant temperature anemomoter positioned in the air stream. During certain engine operating modes, such as at engine idle, these sensors may not provide an accurate indication of air flow into the engine.

As opposed to the foregoing form of air flow meters, in the present invention the mass rate of air flow into an internal combustion engine is determined from the position of the throttle valve in the engine induction passage, the position of the idle air bypass valve and measured parameters including the barometric pressure, the engine manifold pressure and the manifold air temperature. Based on these parameters, a measurement of air flow into the engine is provided including at engine idle conditions to enable accurate control of the air-fuel mixture provided to the engine.

Figure 2:
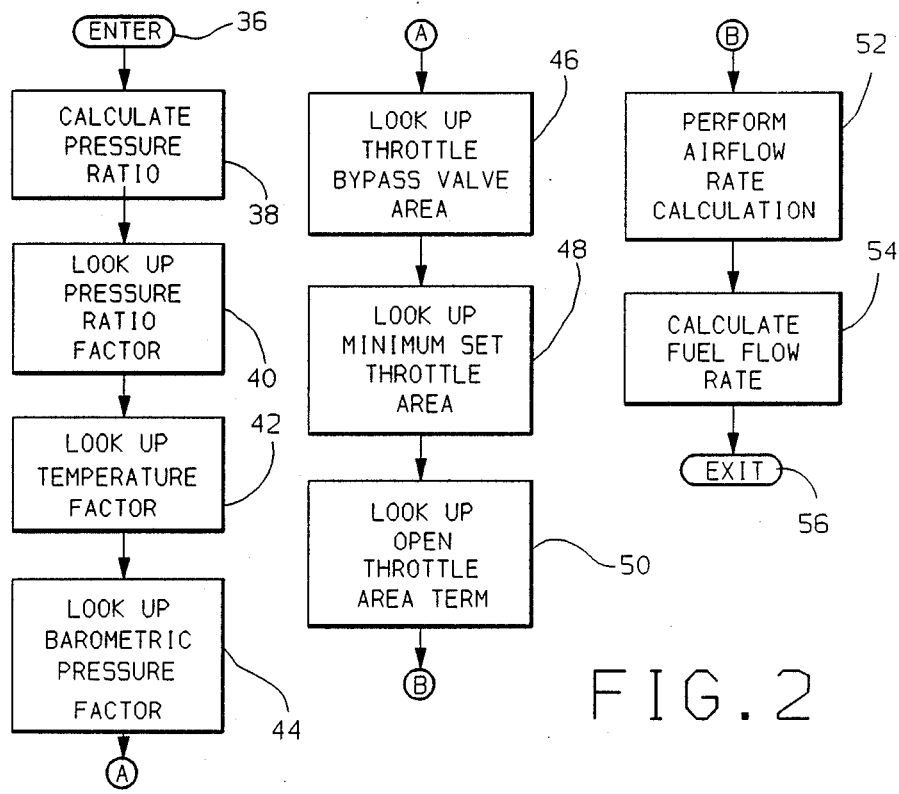

The invention may be best understood by reference to the following description of a preferred embodiment and the drawings in which:

FIG. 1 illustrates a system used with an internal combustion engine for providing mass air flow measurements in accord with the principles of this invention and FIG. 2 is a diagram illustrating the operation of the system of FIG. 1 in determining the mass air flow in accord with the principles of this invention.

Referring to FIG. 1, an internal combustion engine 10 includes an induction passage opening from the atmosphere into an intake manifold 12. The intake passage includes a throttle bore 14 having a variable position throttle 16 therein for varying the effective area of the induction passage to regulate the air flow into the intake manifold 12. An air bypass passage 18 is provided for bypassing air around the throttle blade 16 for idle speed control and for control of air into the intake manifold 12 during engine coast-down periods. The bypass passage 18 includes a bypass valve 20 whose position is controlled by a motor 22, which may take the form of a stepper motor, for establishing the desired air bypass quantity. For example, the motor 22 may be controlled to open the valve for idle speed control to maintain a desired engine idle speed in a manner well known. In this regard, the engine speed may be monitored by means of an electromagnetic pickup 24 sensing the passing of teeth on the engine starter ring gear 26.

The mass air flow measurement system of this invention is described in conjunction with a fuel control system for the engine 10 wherein a fuel injector 28 is controlled to inject fuel into the throttle bore 14 above the throttle 16. The amount of fuel injected is based on the measured mass air flow into the engine so as to establish a desired air/fuel ratio.

The system for measuring the mass air flow into the engine 10, for controlling the fuel injector 28 and for controlling other engine functions such as idle speed takes the form of a digital engine control computer 30. The computer 30 is conventional in form and includes a microprocessor which executes an operating program permanently stored in an internal read-only memory. The read-only memory also contains lookup tables addressed in accord with selected engine parameters as will be described in determining the mass air flow into the engine 10. The computer 30 also includes conventional elements such as a random access memory into which data may be temporarily stored and from which data my be read, a clock which establishes the timing of the digital system, an analog-to-digital converter for converting analog signals to digital signals to be used by the digital computer 30 and input/output circuits for receiving various inputs and for outputting control signals such as for control of the fuel injector 28.

The engine control computer 30 receives the output of the engine speed sensor 24, a signal $P_1$ representing the manifold absolute pressure as sensed by a pressure sensor 32, a signal representing the throttle position as measured by a throttle position sensor 34, a signal representing the barometric pressure $P_0$ provided by a conventional pressure sensor and the engine temperature T provided by a conventional engine temperature transducer.

The engine control computer 30 responds to the various inputs thereto for measuring the mass air flow into the engine 10, controlling the fuel injector 28 to establish a scheduled air/fuel ratio and controls the motor 22 to control the position of the air bypass valve 20 for engine idle speed control and for controlling air input to the engine during periods of engine coast-down.

Air flow through an orifice area is described by the followino expression:

$$M = A * P_O * \sqrt{k/(T*R)} * \sqrt{2/(k-1) * (r_p^{2/k} - r_p^{(k+1)/k})} \tag{1}$$

where M is the mass air flow rate, A is the area of the orifice, $P_0$ is the pressure upstream of the orifice, k is the specific heat of air, R is the perfect gas constant, T is the absolute temperature of the air and $R_P$ is the ratio of the pressures $P_1/P_0$.

From the foregoing expression, it can be seen that the area of the orifice must be known to calculate mass air flow through the orifice. In respect to the air flow into the engine 10, the mass air flow into the engine manifold 12 is dependent upon the effective area of the orifices through which air is provided to the engine 10. These orifices include the effective orifice defined by the throttle blade 16 and the effective orifice defined by the idle air bypass valve 20. The effective orifice area of the throttle bypass valve 20 may be determined as a function of valve position as established by motor 22. Similarly, during open throttle operation, the effective orifice defined by the throttle blade may be determined as a function of the throttle blade angular position. However, at closed throttle, the effective area of the throttle 16 is not directly measurable by the engine control computer 30, yet the flow through the throttle bore 14 during periods of closed throttle operation contribute significantly to the total intake air flow to the engine. In accord with this invention, the effective area of the throttle opening during closed throttle operation of the engine is determined indirectly by knowing the position of the idle air bypass 20 required to maintain a predetermined engine speed and therefore a known mass air flow rate into the engine (since for a given engine speed and load, a known mass of air is consumed).

Based on the foregoing, the following expression is used to determine the flow and consequently the effective orifice area of the throttle during closed throttle operation:

$$\text{AIR FLOW} = \text{IDLE BYPASS AIR} + \text{THROTTLE AIR}. \quad (2)$$

Since the total air flow into the engine is known at a certain engine idle speed and load condition, the closed throttle air flow can then be determined. Knowing the upstream and downstream pressures, this flow is a measure of the effective closed throttle orifice area. By storing the idle air bypass opening during engine idle speed operation, the system may determine the throttle air flow during closed throttle operation at idle so as to provide a measure of the effective throttle area. This provides the capability to periodically determine the effective orifice area of the closed throttle which may change over time due to deposits accumulating on the throttle blade and throttle bore.

The algorithm implemented within the engine control computer 30 to establish the air flow into the engine takes the form of the expression $$\text{AIR FLOW} = (A_3 + A_2 + A_1)*F(P_0)*F(T)*F(P_1/P_0) \quad (3)$$

where $A_3$ is the effective area of the throttle bore 16 during part-throttle operation, $A_2$ is the effective area of the idle air bypass valve 20, $A_1$ is the effective area of the throttle 14 during closed throttle operation, $F(P_0)$ is the ambient pressure term of the expression (1), $F(T)$ is the air temperature term of expression (1) and $F(P_1/P_0)$ is the pressure ratio term of the expression (1).

The experimentally determined effective orifice area of the throttle 14 during part-throttle operation as a function of throttle position is stored in a lookup table in the engine control computer, the experimentally determined effective area of the idle-air bypass valve as a function of its position is stored in a lookup table in the engine control computer, the experimentally determined effective area of the throttle 14 during closed throttle operation as a function of the idle air bypass valve position required to establish the engine idle speed and therefore a known mass air flow into the engine is stored in a lookup table in the engine control computer and the pressure ratio, temperature and barometric pressure functions are predetermined and stored in the engine control computer.

The operation of the engine control computer 30 of FIG. 1 in determining the mass rate of air flow into the engine 10 in accord with the principles of this invention and for establishing the required fuel flow rate to obtain a desired air/fuel ratio is illustrated in FIG. 2 This routine is executed at repeated timed intervals such as 10 milliseconds.

The routine is entered at point 36 and proceeds to a point 38 where the ratio $P_1/P_0$ based on a measurement of the manifold absolute pressure and barometric pressure is determined. The program then proceeds to a step 40 where the pressure ratio factor in the expression (3) for determining mass air flow is obtained from the lookup table in the engine control computer 30. Thereafter, the program similarly obtains from respective lookup tables the temperature factor and the barometric factor of the expression (3) for determining mass air flow.

Next at step 46, the computer obtains from a lookup table the effective orifice area of the throttle bypass valve 20 based on the controlled bypass valve position established by the engine control computer 30. Next at step 48, the program determines the effective orifice area established by the throttle during closed throttle operation as a function of the position of the idle air bypass valve 20 previously determined when the engine control computer 30 last established a desired engine idle speed. As previously indicated, since a known mass air flow is provided to the engine in order to obtain that engine idle speed, and since the air flow through the idle air bypass 18 when the engine control computer 30 is controlling the idle speed of the engine 10 is known, it can be seen that the effective throttle area producing the make up air may be stored as a function of the position of the idle air valve 20 when the idle speed is at the desired idle speed during idle speed control operation of the engine 10. At step 48, the last value of the idle air valve position establishing the idle speed of the engine 10 is used to address a lookup table in the engine control computer 30 storing effective areas of the closed throttle position. At the next step 50, the program obtains from a lookup table the effective orifice area of the throttle 16 as a function of the throttle position signal when the engine 10 is being operated at part-throttle.

Based on the values obtained in the previous steps, the program determines at the next step 52 the air flow into the engine based on the expression (3). Based on the determined mass air flow, the required amount of fuel to be injected into the engine 10 via the fuel injector 28 is determined at step 54 so as to obtain a scheduled air/fuel ratio. Thereafter, the program exits the routine at step 56.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A closed throttle air flow meter for an internal combustion engine having an intake manifold, an induction passage opening from the atmosphere to the intake manifold and including a throttle bore and a variable position throttle in the throttle bore for varying the effective area of the induction passage to regulate the air flow into the intake manifold and further including a throttle bypass passage opening from the atmosphere to the intake manifold and including a variable position valve for varying the effective area of the bypass passage to regulate the air flow into the intake manifold bypassing the throttle, the air flow meter comprising, in combination:

means for controlling the position of the valve in the bypass passage to control the engine idle speed to a predetermined value during an idle speed operating mode of the engine, the total air flow into the intake manifold at the desired engine idle speed having a predetermined value so that the air flow through the throttle bore is equal to the predetermined value less the air flow through the bypass passage;

means for storing the position of the variable position valve when the engine is at the predetermined idle speed value during the engine idle speed operating mode, the stored value representing the air flow value through the bypass passage and therefore the flow value and effective area of the induction passage opening defined by the closed throttle;

means for storing a schedule of values of the effective area $A_1$ of the induction passage opening defined by the closed throttle as a function of the position of the variable position valve when the engine is at the predetermined idle speed;

means for storing a schedule of values of the effective area $A_2$ of the bypass passage defined by the position of the variable position valve;

means for measuring the value $P_0$ of the barometric pressure;

means for measuring the value $P_1$ of the intake manifold;

means for measuring the value $T$ of the manifold air temperature;

means responsive to the scheduled values of $A_1$ and $A_2$ corresponding to the stored position of the variable position valve and the present value of the variable position valve, respectively, and the values $P_0$ of the barometric pressure, $P_1$ of the intake manifold and $T$ of the manifold air temperature for determining the total air flow into the engine during closed throttle position in accord with the expression AIR FLOW $=(A_1+A_2)\ F(P_0)\ F(P_1/P_0)\ F(T)$ where $F(P_0)$, $F(P_1/P_0)$ and $F(T)$ are predetermined functions of the pressure $P_O$, the pressure ratio $P_1/P_0$ and the temperature $T$.

* * * * *